United States Patent
Choudhary et al.

(10) Patent No.: US 9,923,583 B2
(45) Date of Patent: Mar. 20, 2018

(54) COORDINATION BETWEEN MULTIPLE WLAN CORES THAT ARE USING THE SAME FREQUENCY BAND

(71) Applicant: Avago Technologies General IP (Singapore) Pte. Ltd., Singapore (SG)

(72) Inventors: Amit Choudhary, Bangalore (IN); Bijoy Bhukania, Bangalore (IN)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 145 days.

(21) Appl. No.: 14/615,964

(22) Filed: Feb. 6, 2015

(65) Prior Publication Data

US 2016/0233902 A1    Aug. 11, 2016

(51) Int. Cl.
| | |
|---|---|
| H04W 4/00 | (2009.01) |
| H04B 1/10 | (2006.01) |
| H04W 72/12 | (2009.01) |
| H04W 84/12 | (2009.01) |
| H04W 88/02 | (2009.01) |
| H04W 92/10 | (2009.01) |

(52) U.S. Cl.
CPC ...... *H04B 1/1018* (2013.01); *H04W 72/1215* (2013.01); *H04W 4/008* (2013.01); *H04W 84/12* (2013.01); *H04W 88/02* (2013.01); *H04W 92/10* (2013.01)

(58) Field of Classification Search
None
See application file for complete search history.

(56) References Cited

U.S. PATENT DOCUMENTS

| | | | | |
|---|---|---|---|---|
| 8,520,586 | B1* | 8/2013 | Husted | H04W 74/08 370/318 |
| 2007/0165754 | A1* | 7/2007 | Kiukkonen | H04B 1/715 375/346 |
| 2009/0258607 | A1* | 10/2009 | Beninghaus | H04B 1/3805 455/77 |
| 2011/0212696 | A1* | 9/2011 | Hahn | H04B 1/525 455/83 |
| 2012/0201156 | A1* | 8/2012 | Sugimoto | H04B 1/0064 370/252 |
| 2012/0314697 | A1* | 12/2012 | Noh | H04L 1/1628 370/338 |
| 2014/0140381 | A1* | 5/2014 | Sang | H04B 1/406 375/219 |
| 2014/0241406 | A1* | 8/2014 | Yu | H04B 15/02 375/219 |
| 2014/0269650 | A1* | 9/2014 | Sahota | H04W 84/12 370/338 |
| 2014/0286203 | A1* | 9/2014 | Jindal | H04J 11/0026 370/278 |

(Continued)

*Primary Examiner* — Otis L Thompson, Jr.
(74) *Attorney, Agent, or Firm* — Sterne, Kessler, Goldstein & Fox PLLC

(57) ABSTRACT

A system and method to communicate in a wireless local area network (WLAN) device having a first Media Access Control (MAC) and a second MAC is provided. The method includes determining whether the first MAC and the second MAC are transmitting and receiving on the same frequency band, determining whether transmission by the first MAC overlaps with reception by the second MAC, and relaxing a reception criteria by the second MAC when transmission by the first MAC overlaps with reception by the second MAC.

20 Claims, 7 Drawing Sheets

(56) References Cited

U.S. PATENT DOCUMENTS

| | | | |
|---|---|---|---|
| 2015/0036514 A1* | 2/2015 | Zhu | H04W 52/244 370/252 |
| 2015/0133185 A1* | 5/2015 | Chen | H04W 72/1215 455/552.1 |
| 2015/0173118 A1* | 6/2015 | Gholmieh | H04W 76/02 455/436 |
| 2015/0256323 A1* | 9/2015 | Gandarillas Diego | H04L 5/16 370/281 |
| 2015/0264699 A1* | 9/2015 | Fwu | H04L 5/0001 370/329 |
| 2015/0373716 A1* | 12/2015 | Su | H04W 4/008 370/338 |
| 2016/0066255 A1* | 3/2016 | Marinier | H04W 48/16 370/350 |
| 2016/0088548 A1* | 3/2016 | Zhao | H04W 24/02 455/422.1 |
| 2016/0330663 A1* | 11/2016 | Zhou | H04W 4/025 |
| 2016/0330756 A1* | 11/2016 | Sun | H04W 72/1226 |

\* cited by examiner

COORDINATION BETWEEN MULTIPLE WLAN CORES THAT ARE USING THE SAME FREQUENCY BAND

FIELD

Embodiments presented herein generally relate to same band wireless local area network (WLAN) coordination.

BACKGROUND ART

Some WLAN devices have two or more WLAN cores. When one of the cores is transmitting data on a frequency band there can be significant interference for the other core to simultaneously receive data on the same frequency band. Methods and systems are needed to overcome the above deficiency.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 4A:
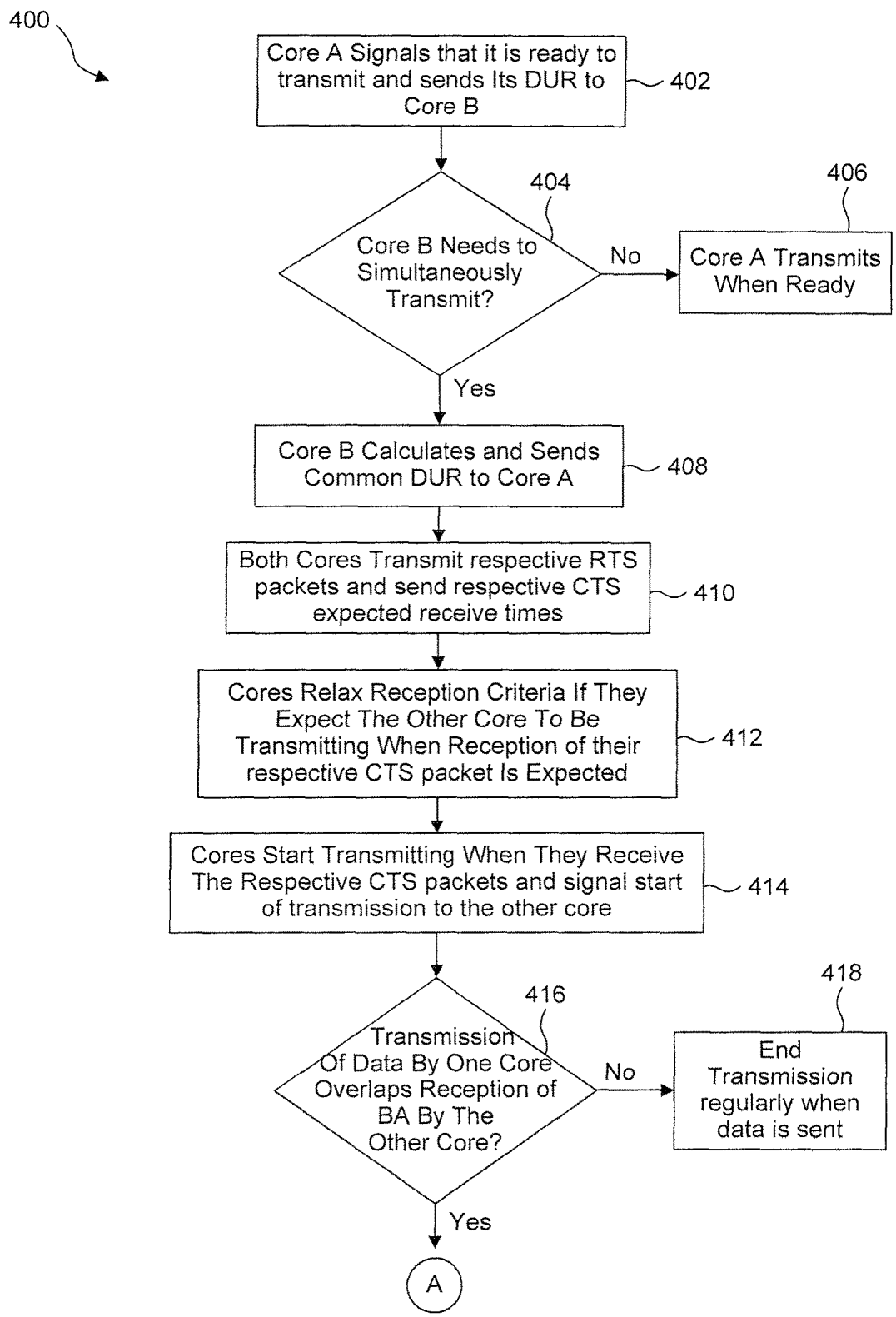
Figure 4B:
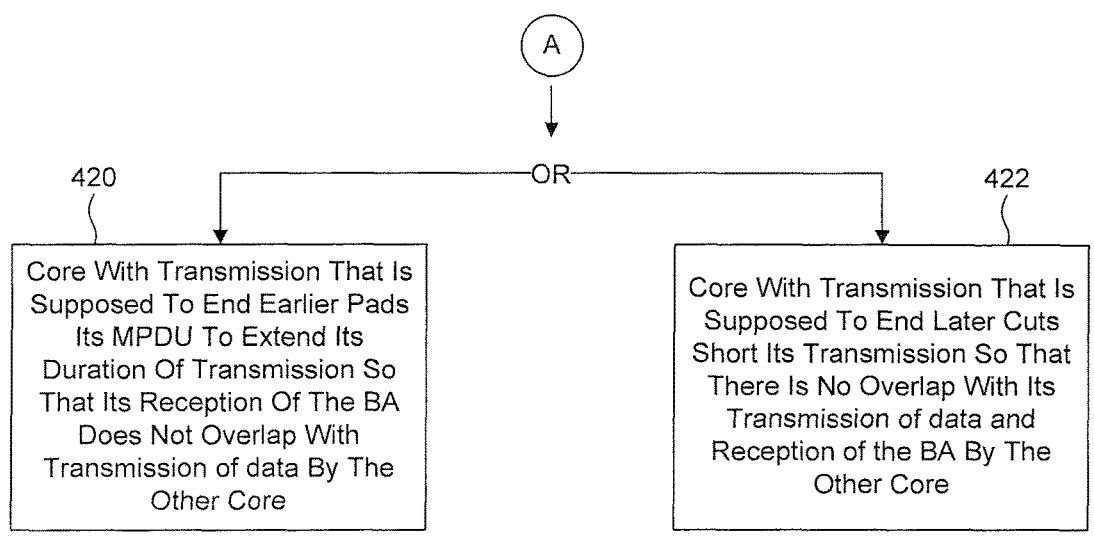

FIG. 4A-B illustrates an example flowchart illustrating steps to relax reception criteria and to align ending of transmissions according to an embodiment of the disclosure.

Figure 5:
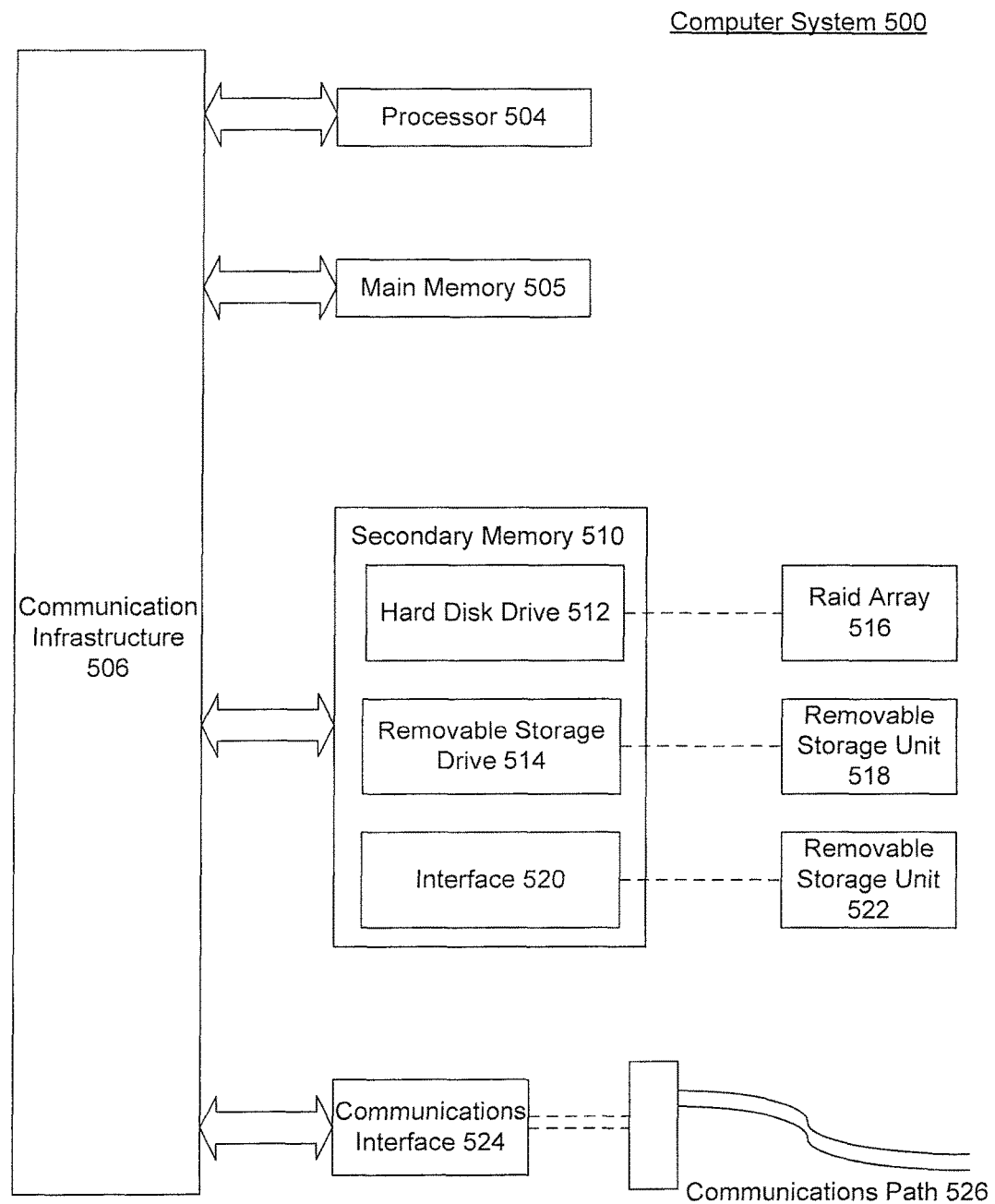

FIG. 5 illustrates an example computer system.

The embodiments of the present disclosure will be described with reference to the accompanying drawings. The drawing in which an element first appears is typically indicated by the leftmost digit(s) in the corresponding reference number.

DETAILED DESCRIPTION OF THE INVENTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

One or more exemplary embodiments described herein can utilize one or more wireless communication protocols, including for example, WLANs as standardized by the Institute of Electrical and Electronics Engineers (IEEE) in the IEEE 802.11 specification, which is incorporated herein by reference in its entirety. Exemplary embodiments are not limited to wireless communication networks conforming to the 802.11 specification, and can be used or implemented in one or more other kinds of wireless communication access networks, including (but not limited to), Bluetooth (IEEE 802.15.1 and Bluetooth Special Interest Group), Near-field Communication (NFC) (ISO/IEC 18092), ZigBee (IEEE 802.15.4), Radio-frequency identification (RFID), and/or infrared communication, to provide some examples. These various standards and/or protocols are each incorporated by reference in their entirety.

Further, exemplary embodiments are not limited to the above wireless communication networks and can be used or implemented in one or more wireless communication networks conforming to one or more 3rd Generation Partnership Project (3GPP) wireless communication protocols and/or to one or more non-3GPP wireless communication protocols. For example, the exemplary embodiments can be configured to utilize one or more cellular communication standards, including (but not limited to) Long-Term Evolution (LTE), Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples.

For the purposes of this discussion, the term "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

Figure 1:
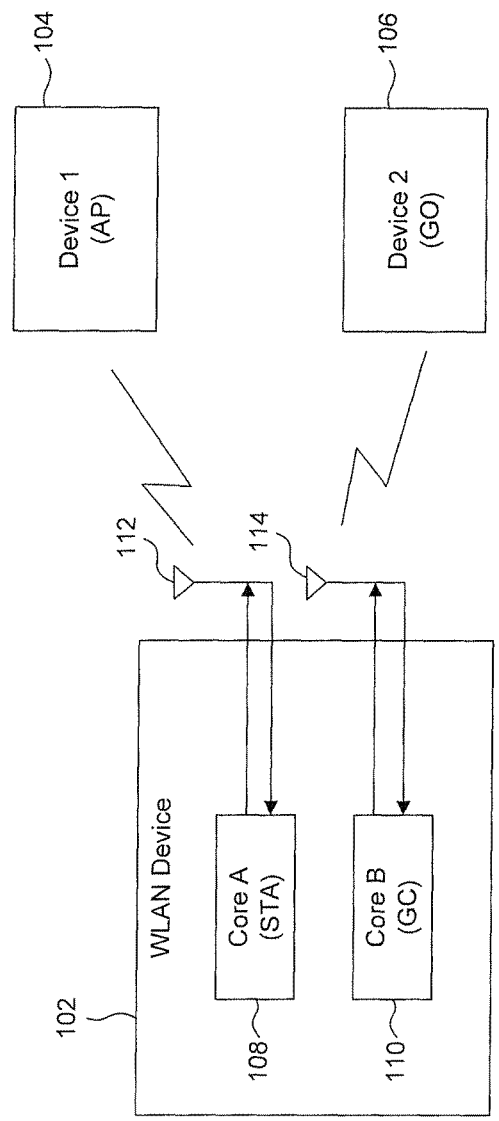
FIG. 1 illustrates communications between wireless local area network (WLAN) devices.

FIG. 1 illustrates communications between wireless local area network (WLAN) devices. FIG. 1 includes a WLAN device 102, a WLAN device 104 and a WLAN device 106. WLAN device 102 includes a core A 108 and a core B 110. Core A 108 is coupled to antenna 112 which is used for transmitting and receiving data. Core B 110 is coupled to antenna 114 which is also used to transmit and receive data. Each core having its own respective antenna provides for greater interference mitigation. In another example, core A 108 and core B 110 both share an antenna for transmitting and receiving data.

A WLAN device may be referred to as a "device" or a "Wi-Fi device" herein. Wi-Fi, also spelled "Wifi" or "WiFi", is a local area wireless technology that allows an electronic device to exchange data or connect to the Internet using 2.4 GHz ultra high frequency (UHF) and 5 GHz super high frequency (SHF) radio waves. The Wi-Fi Alliance defines Wi-Fi as any "wireless local area network (WLAN) products that are based on the Institute of Electrical and Electronics Engineers' (IEEE) 802.11 standards." Since most WLANs are based on these standards, the term "Wi-Fi" is commonly used as a synonym for "WLAN."

In this embodiment in FIG. 1, core A 108 is WLAN station (STA). In IEEE 802.11 terminology, a station (STA) or WLAN station is a device that has the capability to use the 802.11 protocol for wireless communications. For example, a station may be a laptop, a desktop personal computer, a personal digital assistant (PDA), or a WLAN enabled telecommunication device like a smart phone. An STA may be fixed, mobile, or portable. Generally in wireless networking the terms station, wireless client, and node are often used interchangeably. IEEE 802.11 formally defines a station as any device that includes an IEEE 802.11 conformant media access control (MAC) interface and physical layer (PHY) interface to a wireless medium (WM).

In this example, device 104 is an Access Point (AP) that is in communication with core A 108. An AP is a device that allows wireless devices to connect to a wired network using Wi-Fi, or related standards. The AP usually connects to a router (via a wired network) as a standalone device, but it can also be an integral component of the router itself. An AP typically connects directly to a wired Ethernet connection and the AP then provides wireless connections using radio frequency links for other devices to utilize the wired Ethernet connection. Most APs support the connection of multiple wireless devices to one wired connection. In the present example, device 104 is providing WLAN connectivity to core A 108. It is to be appreciated that in an alternate embodiment, core A 108 could be an AP and device 104 could be an STA.

In the present embodiment, core B 110 is a group client (GC) which is in communication with device 106 which is a group owner (GO). A GO is, for example, a cellular phone that acts as a WLAN hotspot to provide WLAN connectivity to other devices such as GCs using a peer-to-peer WLAN protocol, which is also referred to as a WLAN direct link. It is to be appreciated that core A 108 or core B 110 can be any of a station, access point, a group client or a group owner.

Figure 2:
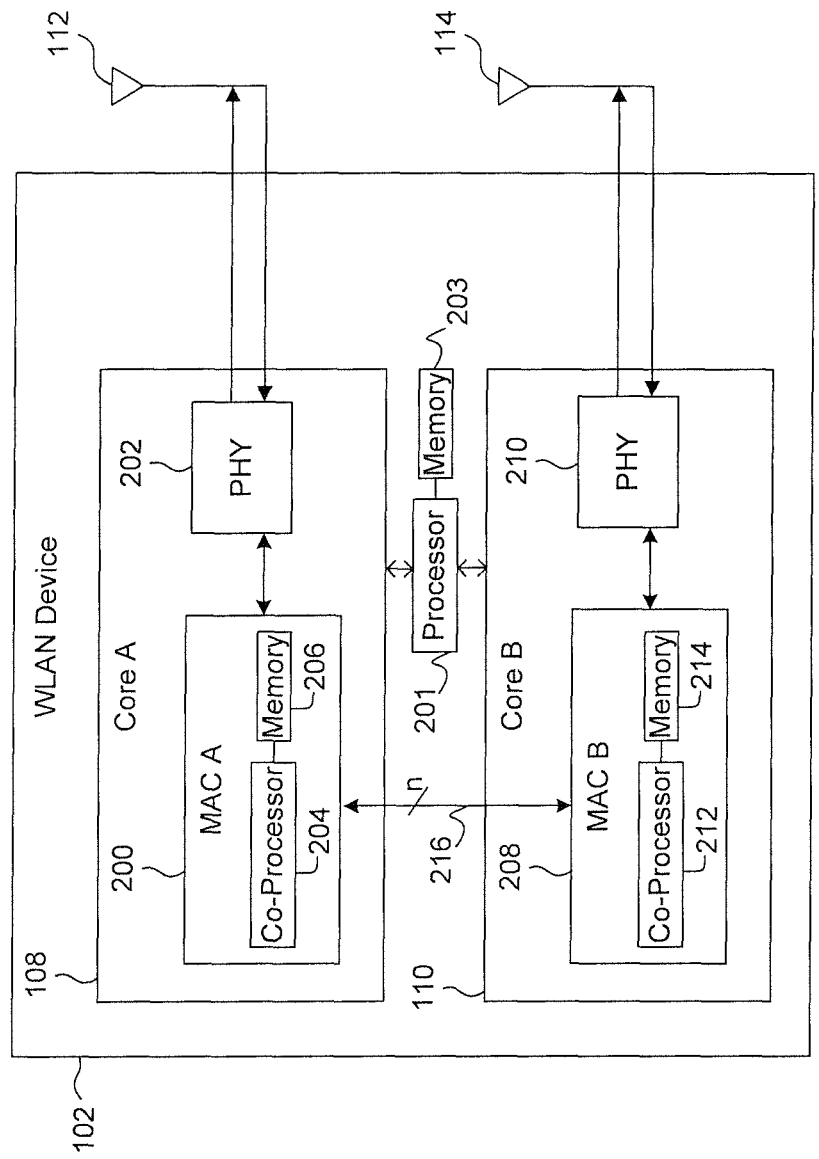
FIG. 2 illustrates an exemplary WLAN device in further detail according to an embodiment of the disclosure.

FIG. 2 further illustrates WLAN device 102 according to an embodiment of the disclosure. Core A 108 includes a MAC 200 coupled to a PHY 202. MAC 200 includes a co-processor 204 coupled to a memory 206. PHY 202 is coupled to the antenna 112. MAC 208 includes a coprocessor 212 coupled to a memory 214. MAC 208 is coupled to a PHY 210. PHY 210 is coupled to antenna 114. WLAN device 102 also includes a processor 201 coupled to a memory 203. In an embodiment, processor 201 controls both core A 108 and core B 110 based on instructions stored in memory 203. Processor 201 can view the state of both core A 108 and core B 110 and maintain contexts for both cores. Each PHY 202 and 210 includes a transmitter and receiver to implement wireless communications using respective antennas 112 and 114, as will be understood by those skilled in the arts.

According to an embodiment of the disclosure, MAC 200 is coupled to MAC 208 by a dedicated bus 216. Bus 216 is n-bits wide. Bus 216 can be a dedicated high-speed bus that allows for direct communication between MAC A 200 and MAC B 208. Bus 216 can be a "dedicated bus" in that no other devices use bus 216 except for MAC A 200 and MAC B 208. A typical WLAN device with multiple MACs requires the MACs to communicate using a commonly shared backplane bus which is much slower than using the bus 216. This is because two or more the components in the WLAN device share the backplane bus for communications. Since two or more the components in a typical WLAN device share the backplane bus, they have to wait till the bus is available (bus contention) to transmit data. In contrast, there is no contention required for MAC A 200 and MAC B 208 to transmit on bus 216 since it's a dedicated high-speed bus that is reserved for their use only. Thus embodiments presented herein allow MAC A 200 and MAC B 208 to send data directly to each other. The receiving MAC receives the data immediately and generates an interrupt if needed for its corresponding co-processor. In alternative embodiments, a non-dedicated bus may be used.

In WLAN RSDB (Real Simultaneous Dual Band) operation, two WLAN cores (such as core A 108 and core B 110) within the same WLAN device (e.g. WLAN device 102) operate on two different WLAN bands, e.g. the 2.4 Ghz and 5 Ghz bands simultaneously. When these two WLAN cores operate in the same band (i.e. either the 2.4 Ghz band or 5 Ghz band), transmissions on one WLAN core creates significant de-sense on simultaneous reception by the other co-located WLAN core. "De-sense" is a measure of interference affecting the sensitivity of reception of data. Simultaneous transmission or simultaneous reception of data by the two cores does not create interference. Only when one core is transmitting and the other is simultaneously receiving on the same frequency band is there significant noise preventing the reception of data by the receiving core. This is because the interfaces are so close together that one's transmission interferes with the other's reception. One core's transmission energy will be higher than the energy on the medium for reception by the other core. The uncoordinated nature of WLAN channel access based on distributed control function (DCF), channel sense multiple access/collision avoidance (CSMA/CA), clear channel assessment (CCA), and random back-off during channel contention, adds substantial unpredictability on coordinating medium access by WLAN cores. Embodiments presented herein allow for modified reception criteria along with alignment of transmission termination times between the two cores.

Figure 3A:
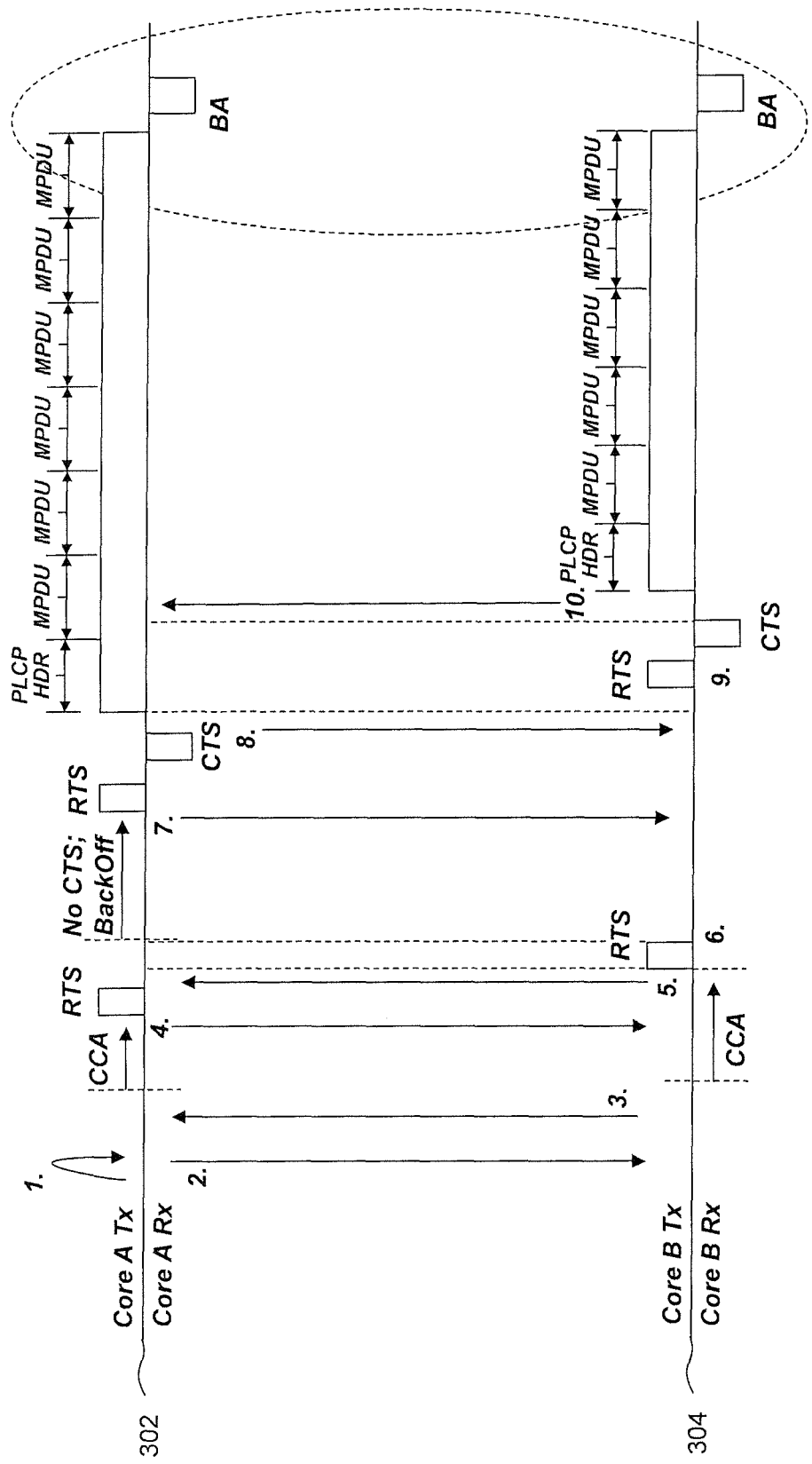
FIG. 3A illustrates an example of same band coordination between two MACs according to an embodiment of the disclosure.

FIG. 3A illustrates an example of same band coordination between core A 108 and core B 110 according to an embodiment of the disclosure. Above line 302 illustrates transmissions by core A 108 (which is an STA in this example) to device 104 (which is an AP in this example). Below line 302 illustrates receptions by core A 108 from device 104. Above line 304 illustrates transmissions by core B 110 (which is a group client in this example) to device 106 (which is a group owner in this example). Below line 304 illustrates reception of data by core B 110 from device 106.

In step 1, core A 108 determines that it needs to transmit data to device 104.

In step 2, MAC A 200 transmits a signal to MAC B 208 via bus 216 indicating a need to transmit data. MAC A 200 provides its duration (DUR) time, which is its desired transmission duration, to MAC B 208. MAC A 200 has a transmission queue (not shown) where it receives packets from an application layer (not shown). Based on transmission queue depth, buffer availability, and a current data rate of transmission, MAC A 200 can determine an amount of data that has to be transmitted and the corresponding DUR.

In step 3, core B 108 determines whether it needs to simultaneously transmit data as well. In this example, core B 108 also needs to simultaneously transmit data. MAC B 208 determines a desired duration of transmission for core B and calculates a common duration of transmission (common DUR) for both core A 108 and core B 110 based on the DUR transmitted by MAC A 200 in step 1. For example, if core A needs to transmit for 4 seconds and core B needs to transmit for 2 second, the common DUR could be 2 seconds. Accordingly, the common DUR can be the amount of transmission time overlap between the two cores. The DUR is part of the WLAN standard and the determination of the common DUR is according to an embodiment of the disclosure. In this example, the common DUR is the minimum of the DUR values of the two cores i.e. 2 seconds. In another example, it could be the maximum of the DUR values of the two cores i.e. 4 seconds. It is to be appreciated that the common DUR can be calculated based on other criteria such as an average of the DUR provided MAC A 200 and MAC B 208.

In step 4, using either CCA or Virtual Carrier Sensing (VCS), core A 108 determines when the wireless medium is available for transmission and transmits a request to send (RTS) frame to device 104 and waits to get a clear to send (CTS) frame from device 104. In WLANs, before transmission starts there is a CCA or VCS. CCA determines whether a channel is being used by another node for transmission or reception. Each of core A 108 and core B 110 senses the wireless medium to determine whether there is energy on the medium indicating transmission or reception on the desired frequency band (i.e. 2.4 Ghz or 5 Ghz band). In another example, the cores use Virtual Carrier Sensing (VCS), which involves searching for whether there is a Network Allocation Vector (NAV) on the wireless medium. The NAV is found in a header of a packet and is at the beginning of a wireless transmission. The NAV indicates a duration of transmission for a wireless device. If a first wireless device detects a NAV from a second wireless device on the wireless medium, then based on the duration of transmission in the NAV, it waits till the second wireless device that generated the NAV has finished transmission. The first wireless device then backs off from transmitting for a random period of time to make sure no other wireless device is transmitting.

Further, in step 4, MAC A 200 also sends a signal to core B 110 indicating that it has sent an RTS frame and an expected duration of when it expects to receive the CTS frame from device 104. If core A 108 doesn't get a CTS frame from device 104, then there was probably a collision of either the RTS or CTS frame and core A 108 cannot transmit. Alternatively, the CTS frame may not have been received due to interference caused by transmissions by core B 110. Accordingly, in an embodiment of the disclosure, core A 108 after sending its RTS frame relaxes its criteria to detect reception of a CTS frame from device 104 as described below.

In conventional systems, according to the WLAN standard, there is strict criteria for detecting and receiving the CTS. A WLAN device expects to receive a CTS frame after a Short Interframe Space (SIFS) duration of sending the RTS frame. SIFS is the amount of time in micro seconds required for a wireless interface to process a received frame (e.g. the RTS frame) and to respond with a response frame (e.g. the CTS frame). Reception of the CTS frame involves detection of energy above a threshold level followed by searching for training sequences. After the training sequences, a MAC header, a payload, and a frame checksum of the CTS frame are received. If the MAC header, payload, or frame checksum (FCS) is defective, the CTS frame is discarded by conventional systems. However, here, according to an embodiment, core A 108 and core B 110 can relax the criteria to receive the CTS frame. For example, if energy received after the SIFS duration is above a certain threshold but any data received after than cannot be decoded to determine whether it is a CTS frame, then an assumption is made that the received energy corresponds to a CTS frame. This is more true when core A 108 or core B 110 senses that there are few other WLAN devices in the network, i.e. there is little contention for channel access, then the respective core can be fairly confident that any energy detected at SIFS duration is the CTS frame that it has been expecting. This is an example of "relaxation of the reception criteria" according to an embodiment of the disclosure. In another example, the CTS frame starts with certain pre-defined training sequences. If the training sequences received match, it is assumed that a CTS frame is received, even if remaining portions of the CTS frame are not received correctly. In a further example, a MAC header may be received after the training sequences and may not be decodable but it is still assumed that the CTS frame is received. The relaxation for CTS frame reception criteria is possible at every step of conventional reception criteria according to embodiments described below.

Energy Detection by the PHY:

In an embodiment, if energy detected on the wireless medium after the SIFS duration of RTS transmission and the energy is above a threshold, e.g. if the energy detected is above −82 dBm in 20 MHz channel, then it is assumed that it a CTS frame.

Channel Sense:

In another embodiment, if the energy detected is above the threshold then, if a frame is received, a matched filter correlation of a short training field (STF) in a SYNC word of the frame under reception is checked to see if it is above a minimum level of auto-correlation with a periodicity expected from an 802.11 waveform. If this is applied as sufficient reception criteria then CTS is assumed received if the matched correlation of the STF in the SYNC word as specified above is successful.

In a further embodiment, in addition to the energy detection and STF correlation, matched filter correlation of a long training field (LTF) in the SYNC word of the frame under reception is checked to see if it is above a minimum level of auto-correlation with a periodicity expected from an 802.11 waveform. If this is applied as sufficient reception criteria then the CTS frame is assumed to be received if the matched correlation of LTF in the SYNC word as specified above is successful.

In a further embodiment, CTS is assumed to be received if in addition to the energy detection, the STF and LTF correlation, it is determined that a Signal (SIG) field decode of the frame is successful.

In yet another embodiment, in addition to the energy detection, STF and LTF correlation, and SIG field decode, it is determined whether payload decode and length countdown are successful such that an expected amount of data as indicated by a length field (in the successfully decoded SIG field) have been received. If this is applied as sufficient reception criteria then CTS is assumed received if the payload decode and length countdown is successful.

PHY Payload Decode/MAC Header and FCS:

If the above criteria are met, the frame is received and decoded. In a further embodiment, a receiver address received in a MAC header of the frame is checked to determine if it matches the receiving device's MAC address. If this is applied as sufficient reception criteria then CTS is assumed to be received if the receiver address received in the MAC header of the frame matches the receiving device's MAC address, even if a MAC Frame Check Sum (FCS) fails. Finally, in a further embodiment, in addition to the above, even if the MAC FCS fails, the CTS is still assumed to be received.

In this example, after step 4 where the RTS was sent, the criteria for reception of the CTS frame by core 108 A is relaxed as described above since it is expected that core B 110 will be transmitting its RTS frame in step 5 when the CTS frame is expected by core A 108. However, in this example, none of the relaxed CTS reception criteria are met since no CTS frame was detected. Its possible that the CTS frame that should have been received by core A 108 in response to the RTS send by core A 108 in step 4 was lost due to the overlap with the RTS frame transmitted by core B in step 5. In step 5, MAC B 208 also sends a signal to MAC A 200 indicating transmission of the RTS frame and an expected duration (CTS Rx time) of when it expects the corresponding CTS frame. This is because the transmission of the RTS frame by core B 110 may have created so much interference that the reception of the CTS frame sent by the device 104 to core A 108 may not have been detected by core A 108 even after relaxation of CTS reception criteria. In response to no reception of the CTS frame after transmission of the RTS frame in step 4, core A 108 backs off for a specific duration as specified by the WLAN standard before again sending the RTS in step 7.

In step 6, after sending the RTS in step 5, core B 110 relaxes its criteria to receive a CTS frame from device 106.

In step 7, another RTS frame is transmitted by core A 108 to device 104 and a CTS Rx time is sent by MAC A 200 to MAC B 208. The CTS Rx time is the same as the SIFS duration within which core A 108 expects to receive the CTS from device 104. In an embodiment, transmitting the CTS Rx time gives core B 110 the option to not transmit any data or its own RTS frame when the CTS is expected by core A 108. Similarly, in steps 4 and 5, one core informing the other core that it is has transmitted an RTS frame and is expecting a CTS frame gives the other interface the option of not transmitting in the duration when the CTS is expected so as to not interfere with CTS reception.

In step 8, core A 108 receives a CTS frame in response to the RTS frame sent in step 7 and is ready to transmit. MAC A 200 sends a TX On signal to MAC B 208 to indicate that it is about to transmit. A WLAN data transmission starts with a Physical Layer Convergence Procedure (PLCP) header and is followed by MAC Protocol Data Unit (MPDU) packets.

In step 9, core B 110 again sends an RTS frame to device 106 since it did not receive a CTS frame from device 106 within the SIFS duration of sending the RTS frame in step 6. Furthermore, in step 9, in response to receiving the indication from MAC A 200 in step 8 that it is ready to transmit data, core B 110 relaxes its criteria for detecting a CTS frame from device 106.

In step 10, core B receives a CTS frame from device 106. MAC B 208 sends a TX On signal to MAC A 200 via bus 216 indicating that it is about to start transmission.

When a WLAN data transmission ends, a block acknowledgement (BA) is received that indicates whether the transmission was successful. It is an object of the embodiments herein to ensure that the BA is received. The BA is expected to be received at a certain pre-determined time after transmission has ended. If core B 110 is still transmitting data while core A 108 has finished its transmission and is waiting for its block acknowledgement from device 104, the transmissions by core B 110 can create significant interference with reception of the block acknowledgement by core A 108. If the block acknowledgement is not received by core A 108, then it will have to retransmit the data. In an embodiment, core A 108 could relax its criteria for receiving the BA similar to the relaxation of reception criteria described above for receiving a CTS frame. In another embodiment, both core A 108 and core B 110 can coordinate to end their transmissions so that their respective block acknowledgements overlap. This is because simultaneous reception by both cores does not create interference; only transmission by one core while the other core is simultaneously trying to receive creates interference for the receiving core.

Figure 3B:
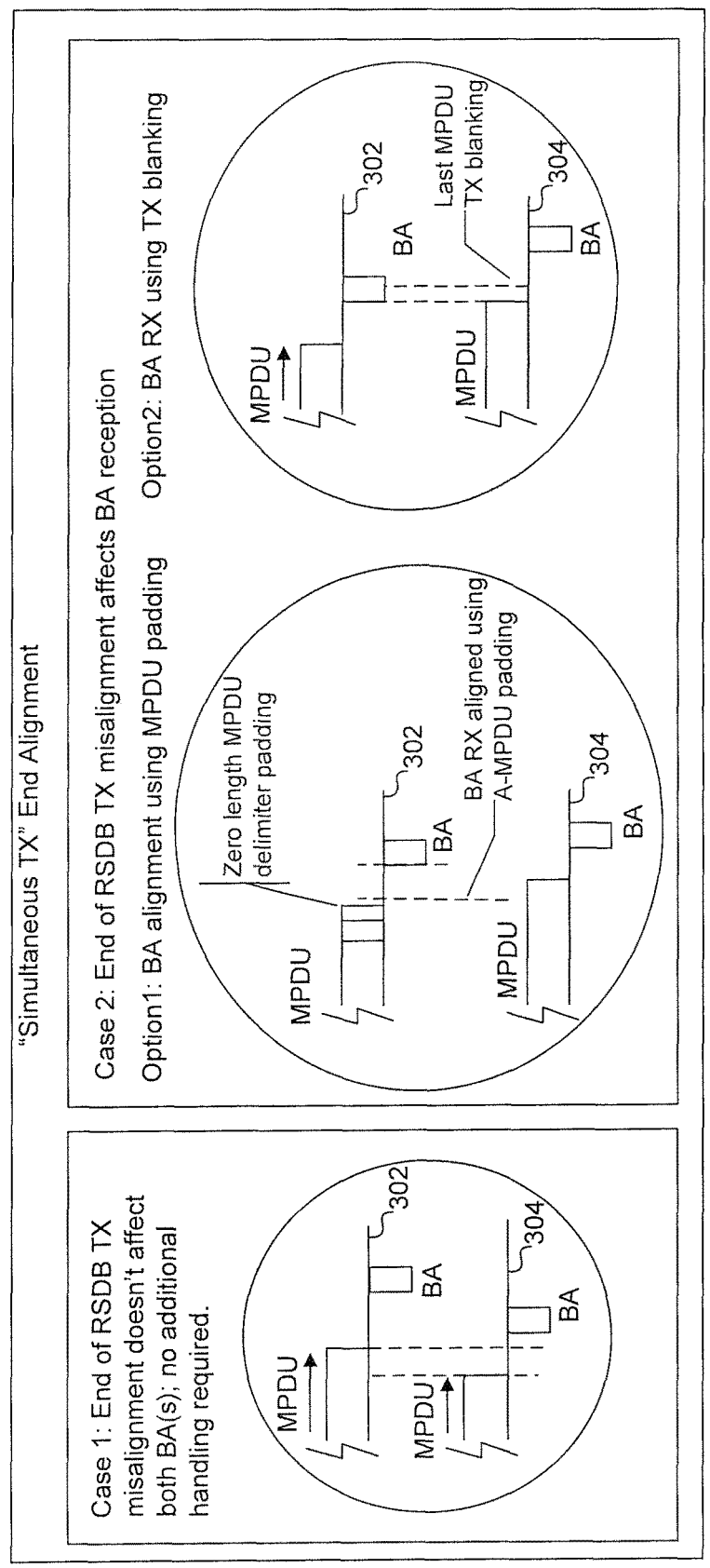
FIG. 3B illustrates embodiments to end transmissions by two WLAN cores such that there is no interference with either core receiving its respective block acknowledgement.

FIG. 3B illustrates embodiments to end transmissions by core A 108 and core B 110 such that there is no interference with either core receiving its respective block acknowledgement.

Case 1 illustrates the ideal case where both core A 108 and core B 110 naturally end their transmissions at a time such that their respective block acknowledgements can be received without interference. Both transmissions end at approximately the same time so that a transmission by one core doesn't overlap with BA reception by the other core.

Case 2 illustrates two options according to embodiments of the disclosure when core A ends its transmissions before core B 110 resulting in interference in reception of the block acknowledgement by core A 108 due to continuing data transmissions by core B 110. In option 1, core A 108 pads its last MAC Protocol Data Unit (MPDU) with a zero length MPDU delimiter padding to extend duration of its transmission such that its BA reception doesn't overlap with the transmission of data by core B 110. Core A 108 determines the duration of core B's transmission based on the TX On signal by core B 110 in step 10 and the common_DUR in step 3. Core A 108 determines when core B 110 will end its transmission by adding the common_DUR time to the time when core B 110 starts its transmission in step 10.

In option 2, according to an embodiment of the disclosure, core B 110 curtails its transmission so that there is no overlap in transmissions by core B 110 and reception of the BA by core A 108. For example, as illustrated in FIG. 3A, core B sends 5 MPDU's instead of 6 MPDU's as sent by core A 108. Core B 110 determines when core A 108 will end its transmission based on the TX On signal sent by core A 108 in step 8 of FIG. 3A and the common_DUR determined in step 3. Curtailing the transmission by core B 110 will not result in a re-transmission requirement since core B can re-transmit the last MPDU (or however many MPDUs were curtailed) in a next transmission to device 106. Each MPDU has its own frame check sequence (FCS). So the last MPDU that is cut short by core B 110 will receive a FCS from device 106 that indicates the last MPDU was not received and core B 110 will then re-transmit the last MPDU to device 106.

FIGS. 4A and 4B illustrates an example flowchart 400 illustrating steps to relax reception criteria and to align ending of transmissions according to an embodiment of the disclosure. Flowchart 400 will be described with continued reference to the example operating environment depicted in FIGS. 1-3. However, the process is not limited to these embodiments. Note that some steps shown in flowchart 400 do not necessarily have to occur in the order shown. In an example, the steps in flowchart 400 are performed by one or more of core A 108, core B 110, MAC A 200, MAC B 208, or by one or more of processor 201, co-processor 204, or co-processor 212 based on instructions stored in memory 203, memory 206 or memory 214 respectively.

In step 402, a signal is sent from a first WLAN core to a second WLAN core to indicate that the first WLAN core needs to transmit data. For example, MAC A 200 sends a signal to MAC B 208 indicating a pending data transmission. MAC A 200 also transmits a duration estimate (DUR) of how long it expects to transmit data.

In step 404, the second WLAN core determines whether it also needs to simultaneously transmit at the same time as the first WLAN core. For example, MAC B 208 determines if it needs to transmit data at the same time as MAC A 200. If it is determined that the second WLAN core does not need to transmit during the same time, then the process proceeds to step 406, otherwise the process proceeds to step 408.

In step 406, the first WLAN core transmits data after it has acquired the channel and is ready to transmit. For example, core A 108 transmits data after performing a clear channel assessment.

In step 408, based on the durational estimate provided by the first WLAN core in step 402, the second WLAN core calculates and sends a common duration to the first WLAN core. For example, MAC 208 calculates a common duration and sends it to MAC A 200 via bus 216. In an example, the common duration is a common minimum duration of transmission for both cores. In another example, the common duration might be determined based on another algorithm.

In step 410, each core transmits a respective RTS frame to acquire the channel to transmit data. In addition, when each core transmits its respective RTS frame it also sends a signal to the other core indicating that it expects to receive a CTS frame within a certain period of time. For example, both core A 108 and core B 110 transmit respective RTS frames. MAC A 200 sends a time period to MAC B 208 within which it expects to receive its respective CTS frame. MAC B 208 similarly sends a time period to MAC A 200 within which it expects to receive its respective CTS frame.

In step 412, a WLAN core may relax its reception criteria for receiving a CTS frames if it expects the other WLAN core to be transmitting data when it expects to receive the CTS frame corresponding the RTS frame transmitted in step 410. For example, either core A 108 and/or core B 110 may relax its criteria as described above for receiving CTS frames if either core expects the other core to be transmitting when it expects to be receiving a CTS frame.

In step 414, the cores start transmitting when they both receive their respective CTS frames and signal to the other core that they have begun transmission. For example, in step 8 of FIG. 3A, core A 108 receives its CTS frame, starts transmitting and MAC A 200 sends a TX On signal to MAC B 208. Similarly, in step 10 of FIG. 3A, core B 110 receives its CTS frame, starts transmitting, and MAC B 208 sends a TX On signal to MAC A 200 as well.

In step 416, both cores determine whether transmission of data by one of the cores will overlap with reception of a block acknowledgement by the other core. For example, both core A 108 and core B 110 can determine whether the block acknowledgment to be received by one core will overlap with data transmissions by the other core. These determinations are made based on the common duration in step 208 and the time when the respective core received the TX On signal from the other core in step 414. If there is no overlap between the reception of the BA by one core and transmission by the other core, then each core terminates transmission naturally in step 418. For example, as shown in case 1 of FIG. 3B, both core A 108 and core B 110 end their transmissions in a regularly scheduled manner at a time such that their respective block acknowledgements can be received without interference from the other core.

If there is going to be an overlap between transmission of data by one core and reception of a block acknowledgement by the other core, then the process can proceed to either step 420 or step 422 based on implementation preferences.

In step 420, the core with the transmission that is supposed to end earlier pads its last packet with zeroes or other filler data to extend the duration of its transmission so that reception of its block acknowledgment does not overlap with transmission by the other core. For example, as shown in option 1 of FIG. 3B, core A 108 pads its last MPDU packet with a zero length MPDU delimited padding to extend its transmission time.

In step 422, the core with the transmission that is supposed to end later curtails its transmission so there is no overlap with its transmission and reception of the block acknowledgement by the other core. For example, in option 2 of FIG. 3B, core B 110 curtails its transmission so that it doesn't interfere with reception of a BA by core A 108. Stated another way, one of the cores modifies its transmission schedule so as to preclude interference with a block acknowledgement.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

The following describes a general-purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 500 is shown in FIG. 5. The computer system 500 includes one or more processors, such as processor 504. Processor 504 can be a special purpose or a general-purpose digital signal processor. The processor 504 is connected to a communication infrastructure 506 (for example, a bus or network). Various software implementations are described in terms of this exemplary computer system. After reading this description, it will become apparent to a person skilled in the relevant art how to implement the disclosure using other computer systems and/or computer architectures.

Computer system 500 also includes a main memory 505, preferably random access memory (RAM), and may also include a secondary memory 510. The secondary memory 510 may include, for example, a hard disk drive 512, and/or a RAID array 516, and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518 represents a floppy disk, magnetic tape, optical disk, etc. As will be appreciated, the removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software (i.e. instructions) and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a PCM-CIA slot and card, etc, that are coupled to a communications path 526. The communications path 526 can be implemented using wire or cable, fiber optics, a phone line, a cellular phone link, an RF link and other communications links or channels.

The terms "computer program medium" and "computer usable medium" are used herein to generally refer to media such as removable storage drive 514, a hard disk installed in hard disk drive 512, or other hardware type memory. These computer program products are means for providing or storing software (e.g. instructions) to computer system 500.

Computer programs (also called computer control logic) are stored in main memory 505 and/or secondary memory 510. Computer programs may also be received via communications interface 524. Such computer programs, when executed, enable the computer system 500 to implement the present disclosure as discussed herein. In particular, the computer programs, when executed, enable the processor 504 to implement the processes and/or functions of the present disclosure. For example, when executed, the computer programs enable processor 504 to implement part of or all of the steps described above with reference to the flowcharts herein. Where the disclosure is implemented using software, the software may be stored in a computer program product and loaded into computer system 500 using raid array 516, removable storage drive 514, hard drive 512 or communications interface 524.

In other embodiments, features of the disclosure are implemented primarily in hardware using, for example, hardware components such as Application Specific Integrated Circuits (ASICs) and programmable or static gate arrays or other state machine logic. Implementation of a hardware state machine so as to perform the functions described herein will also be apparent to persons skilled in the relevant art(s).

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any hardware mechanism for storing information in a form readable by a machine (e.g., a computing device). For example, a machine-readable medium may include read only memory (ROM); random access memory (RAM); magnetic disk storage media; optical storage media; flash memory devices; and other hardware implementations. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not Abstract section, is intended to be used to interpret the claims. The Abstract section may set forth one or more but not all exemplary embodiments of the present disclosure as contemplated by the inventors, and thus, is not intended to limit the present disclosure and the appended claims in any way.

The embodiments presented herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A method to communicate in a wireless local area network (WLAN) device having a first Media Access Control (MAC) and a second MAC, comprising:
   determining whether transmission by the first MAC overlaps with reception by the second MAC using a same frequency band; and
   relaxing a reception criteria by the second MAC when transmission by the first MAC overlaps with reception by the second MAC using the same frequency band and when an energy level of a channel received signal (CRS) is above a threshold energy level,
   wherein the first MAC and the second MAC operate under a WLAN protocol.

2. The method of claim 1, wherein relaxing the reception criteria includes:
   receiving the CRS, wherein the CRS is associated with a clear to send (CTS) frame;

determining, in a first stage of the reception criteria, whether the energy level of the CRS is above the threshold energy level; and assuming reception of the CTS frame when the energy level of the CRS is above the threshold energy level, even when other stages of the reception criteria are not satisfied.

3. The method of claim 1, wherein relaxing the reception criteria includes:

receiving the CRS, wherein the CRS is associated with a clear to send (CTS) frame;

determining, in a first stage of the reception criteria, whether the energy level of the CRS is above the threshold energy level;

receiving a frame;

determining, in a second stage of the reception criteria, whether a matched filter correlation of a short training field (STF) in a synchronization (SYNC) word of the frame is above a minimum level of auto-correlation and has an expected periodicity when the energy level of the CRS is above the threshold energy level; and assuming reception of the CTS frame if the matched filter correlation is above the minimum level and has the expected periodicity, even when other stages of the reception criteria are not satisfied.

4. The method of claim 1, wherein relaxing the reception criteria includes:

receiving the CRS, wherein the CRS is associated with a clear to send (CTS) frame;

determining, in a first stage of the reception criteria, whether the energy level of the CRS is above the threshold energy level;

receiving a frame;

determining, in a second stage of the reception criteria, whether a first matched filter correlation of a short training field (STF) in a synchronization (SYNC) word of the frame is above a first minimum level of auto-correlation and has a first expected periodicity when the energy level of the CRS is above the threshold energy level;

determining, in a third stage of the reception criteria, whether a second matched filter correlation of a long training field (LTF) in the SYNC word of the frame is above a second minimum level of auto-correlation and has a second expected periodicity when the first matched filter correlation is above the first minimum level and has the first expected periodicity; and assuming reception of the CTS frame if the second matched filter correlation is above the second minimum level and has the second expected periodicity, even when other stages of the reception criteria are not satisfied.

5. The method of claim 1, wherein relaxing the reception criteria includes:

receiving the CRS, wherein the CRS is associated with a clear to send (CTS) frame;

determining, in a first stage of the reception criteria, whether the energy level of the CRS is above the threshold energy level;

receiving a frame;

determining, in a second stage of the reception criteria, whether a first matched filter correlation of a short training field (STF) in a synchronization (SYNC) word of the frame is above a first minimum level of auto-correlation and has a first expected periodicity when the energy level of CRS is above the threshold energy level;

determining, in a third stage of the reception criteria, whether a second matched filter correlation of a long training field (LTF) in the SYNC word of the frame is above a second minimum level of auto-correlation and has a second expected periodicity when the first matched filter correlation is above the first minimum level and has the first expected periodicity;

determining, in a fourth stage of the reception criteria, whether a Signal (SIG) field of the frame is successfully decoded when the second matched filter correlation is above the second minimum level and has the second expected periodicity; and assuming reception of the CTS frame when the SIG field is successfully decoded, even when other stages of the reception criteria are not satisfied.

6. The method of claim 1, wherein relaxing the reception criteria includes:

receiving the CRS, wherein the CRS is associated with a clear to send (CTS) frame;

determining, in a first stage of the reception criteria, whether the energy level of the CRS is above the threshold energy level;

receiving a frame;

determining, in a second stage of the reception criteria, whether a first matched filter correlation of a short training field (STF) in a synchronization (SYNC) word of the frame is above a first minimum level of auto-correlation and has a first expected periodicity when the energy level of the CRS is above the threshold energy level;

determining, in a third stage of the reception criteria, whether a second matched filter correlation of a long training field (LTF) in the SYNC word of the frame is above a second minimum level of auto-correlation and has a second expected periodicity when the first matched filter correlation is above the first minimum level and has the first expected periodicity;

determining, in a fourth stage of the reception criteria, whether a Signal (SIG) field of the frame is successfully decoded when the second matched filter correlation is above the second minimum level and has the second expected periodicity;

receiving a payload field of the frame;

determining, in a fifth stage of the reception criteria, whether an expected amount of data indicated by a length field of the SIG field has been received in the payload field; and assuming reception of the CTS frame if the expected amount of data is received, even when other stages of the reception criteria are not satisfied.

7. The method of claim 1, wherein relaxing the reception criteria includes:

receiving the CRS, wherein the CRS is associated with a clear to send (CTS) frame;

determining, in a first stage of the reception criteria, whether the energy level of the CRS is above the threshold energy level;

receiving a frame;

determining, in a second stage of the reception criteria, whether a first matched filter correlation of a short training field (STF) in a synchronization (SYNC) word of the frame is above a first minimum level of auto-correlation and has a first expected periodicity when the energy level of the CRS is above the threshold energy level;

determining, in a third stage of the reception criteria, whether a second matched filter correlation of a long training field (LTF) in the SYNC word of the frame is above a second minimum level of auto-correlation and has a second expected periodicity when the first matched filter correlation is above the first minimum level and has the first expected periodicity;

determining, in a fourth stage of the reception criteria, whether a Signal (SIG) field of the frame is successfully decoded when the second matched filter correlation is above the second minimum level and has the second expected periodicity;

receiving a payload field of the frame;

determining, in a fifth stage of the reception criteria, whether an expected amount of data as indicated by a length field of the SIG field has been received in the payload field;

determining, in a sixth stage of the reception criteria, whether a MAC address in a MAC header matches a MAC address of the second MAC when the expected amount of data has been received; and assuming reception of the CTS frame when there is a match between the MAC address in the MAC header and the MAC address of the second MAC, even when other stages of the reception criteria are not satisfied.

8. A wireless local area network (WLAN) device, comprising:

a first Media Access Control (MAC); and a second MAC coupled to the first MAC, wherein the first MAC and the second MAC operate under a WLAN protocol, and wherein the second MAC is configured to:

determine whether the first MAC and the second MAC are wirelessly communicating with external devices using a same frequency band, determine whether transmission by the first MAC overlaps with reception by the second MAC, and relax a reception criteria by the second MAC when transmission by the first MAC overlaps with reception by the second MAC and when an energy level of a channel received signal (CRS) is above a threshold energy level.

9. The WLAN device of claim 8, wherein the second MAC is further configured to:

receive the CRS, determine whether the energy level of the CRS is above the threshold energy level, and assume reception of a clear to send (CTS) frame when the energy level of the CRS is above the threshold energy level.

10. The WLAN device of claim 8, wherein the second MAC is further configured to:

receive the CRS, determine whether the energy level of the CRS is above the threshold energy level, receive a frame, determine whether a matched filter correlation of a short training field (STF) in a synchronization (SYNC) word of the frame is above a minimum level of auto-correlation and has an expected periodicity when the energy level of the CRS is above the threshold energy level, and assume reception of a clear to send (CTS) frame if the matched filter correlation is above the minimum level and has the expected periodicity.

11. The WLAN device of claim 8, wherein the second MAC is further configured to:

receive the CRS, determine whether the energy level of the CRS is above the threshold energy level, receive a frame, determine whether a first matched filter correlation of a short training field (STF) in a synchronization (SYNC) word of the frame is above a first minimum level of auto-correlation and has a first expected periodicity when the energy level of the CRS is above the threshold energy level, determine whether a second matched filter correlation of a long training field (LTF) in the SYNC word of the frame is above a second minimum level of auto-correlation and has a second expected periodicity when the first matched filter correlation is above the first minimum level and has the first expected periodicity, and assume reception of a clear to send (CTS) frame if the second matched filter correlation is above the second minimum level and has the second expected periodicity.

12. The WLAN device of claim 8, wherein the second MAC is further configured to:

receive the CRS, determine whether the energy level of the CRS is above the threshold energy level, receive a frame, determine whether a first matched filter correlation of a short training field (STF) in a synchronization (SYNC) word of the frame is above a first minimum level of auto-correlation and has a first expected periodicity when the energy level of the CRS is above the threshold energy level, determine whether a second matched filter correlation of a long training field (LTF) in the SYNC word of the frame is above a second minimum level of auto-correlation and has a second expected periodicity when the first matched filter correlation is above the first minimum level and has the first expected periodicity, determine whether a Signal (SIG) field of the frame is successfully decoded when the second matched filter correlation is above the second minimum level and has the second expected periodicity; and assume reception of a clear to send (CTS) frame when the SIG field is successfully decoded.

13. The WLAN device of claim 8, wherein the second MAC is further configured to:

receive the CRS, determine whether the energy level of the CRS is above the threshold energy level, receive a frame, determine whether a first matched filter correlation of a short training field (STF) in a synchronization (SYNC) word of the frame is above a first minimum level of auto-correlation and has a first expected periodicity when the energy level of the CRS is above the threshold energy level, determine whether a second matched filter correlation of a long training field (LTF) in the SYNC word of the frame is above a second minimum level of auto-correlation and has a second expected periodicity when the first matched filter correlation is above the first minimum level and has the first expected periodicity, determine whether a Signal (SIG) field of the frame is successfully decoded when the second matched filter correlation is above the second minimum level and has the second expected periodicity, receive a payload field of the frame, determine whether an expected amount of data as indicated by a length field of the SIG field has been received in the payload field, determine whether a MAC address in a MAC header matches a MAC address of the second MAC when the expected amount of data has been received; and assume reception of a clear to send (CTS) frame when there is a match between the MAC address in the MAC header and the MAC address of the second MAC.

14. A method to communicate in a wireless local area network (WLAN) device having a first Media Access Control (MAC) and a second MAC, comprising:

transmitting a first signal by the first MAC to the second MAC indicating a beginning of a first data transmission by the first MAC, wherein the first MAC and the second MAC operate under a WLAN protocol;

transmitting a second signal by the second MAC to the first MAC indicating a beginning of a second data transmission by the second MAC;

determining whether a block acknowledgement to be received by the first MAC will overlap with the second data transmission; and padding the first data transmission to extend the first data transmission or curtailing the second data transmission only when the block acknowledgement to be received by the first MAC is expected to overlap with the second data transmission.

15. The method of claim 14, further comprising:
determining a common duration of transmission for the first MAC and the second MAC.

16. The method of claim 14, further comprising:
determining whether the first data transmission ends before the second data transmission based on a common duration of transmission, the first signal, and the second signal.

17. A wireless local area network (WLAN) device, comprising:

a first Media Access Control (MAC); and a second MAC coupled to the first MAC, wherein the first MAC and the second MAC operate under a WLAN protocol;

wherein the first MAC is configured to transmit a first signal to the second MAC indicating beginning of a first data transmission by the first MAC and a duration of the first data transmission;

wherein the second MAC is configured to transmit a second signal to the first MAC to indicate beginning of a second data transmission by the second MAC; and wherein the first MAC is configured to determine whether a block acknowledgement to be received by the first MAC will overlap with the second data transmission, and pad the first data transmission to extend the first data transmission only when the block acknowledgement to be received by the first MAC is expected to overlap with the second data transmission.

18. The WLAN device of claim 17, wherein the second MAC is further configured to determine a common duration of transmission for the first MAC and the second MAC and transmit the common duration to the first MAC.

19. The WLAN device of claim 17, wherein the first MAC is further configured to determine a common duration of transmission based on a desired duration of transmission of the first MAC and the second MAC.

20. The WLAN device of claim 17, wherein the first MAC is further configured to determine whether the first data transmission ends before the second data transmission based on a common duration of transmission and the second signal.

* * * * *